United States Patent [19]

Aquino

[11] 4,120,417
[45] Oct. 17, 1978

[54] SYSTEMS WITH DISPOSABLE TRAYS

[76] Inventor: Salvatore A. Aquino, 337 Trevor La., Bala-Cynwyd, Pa. 19004

[21] Appl. No.: 822,508

[22] Filed: Aug. 8, 1977

[51] Int. Cl.² .................. B65D 7/24; B65D 25/14
[52] U.S. Cl. ............................. 220/6; 217/48; 220/401
[58] Field of Search .............. 220/4 F, 6, 7, 17; 217/48, 16; 108/56.1, 56.3; 312/256, 260, 263, 331

[56] References Cited
U.S. PATENT DOCUMENTS

| | | | |
|---|---|---|---|
| 846,452 | 3/1907 | Byrne | 220/84 |
| 1,682,489 | 8/1928 | Dershimer | 220/7 |
| 1,930,547 | 10/1933 | Bales et al. | 312/331 |
| 2,525,838 | 10/1950 | Smith et al. | 217/16 |
| 2,688,420 | 9/1954 | Bishop et al. | 220/84 |
| 2,963,192 | 12/1960 | Tornqvist | 220/6 |
| 3,376,994 | 4/1968 | Flinn, Jr. | 220/6 |
| 3,499,696 | 3/1970 | Stark | 312/331 |
| 3,527,339 | 9/1970 | Cipolla | 217/14 |
| 3,544,021 | 12/1970 | Wilson et al. | 220/7 |
| 3,941,271 | 3/1976 | Zarges et al. | 220/6 |

*Primary Examiner*—William Price
*Assistant Examiner*—Allan N. Shoap
*Attorney, Agent, or Firm*—Caesar, Rivise, Bernstein & Cohen, Ltd.

[57] ABSTRACT

A permanent, reusable, open skeletal-type crate that is permanently erect or collapsible. The crate is constructed to hold an inexpensive tray that is disposable. The tray in turn holds any desired number of individual containers of fluid or otherwise. In the preferred form the crate is collapsible and possesses hinged bottom end pieces that are slidable as allowed by a slot in a bottom strap. The erect crate may receive a tray holding the fluid or other containers with the crate and the tray constituting a system that is delivered to a retail outlet or alternatively the tray with its contents is deposited in the retail outlet. The crate has exceptional stacking strength with special corner posts. However, the crate is weak in the side to side direction and the end to end direction to eliminate uses that are prevelant with present milk crates.

4 Claims, 8 Drawing Figures

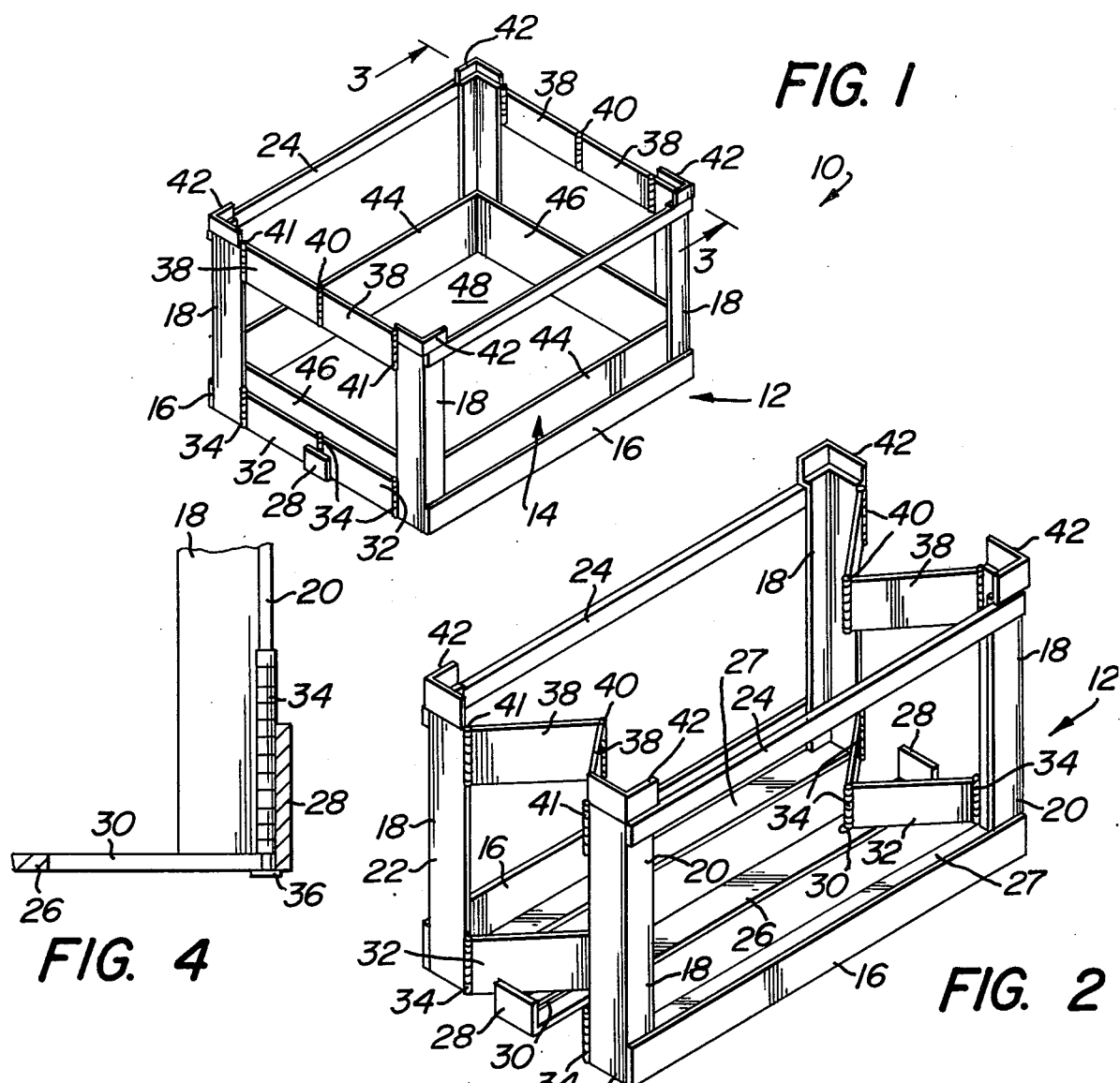
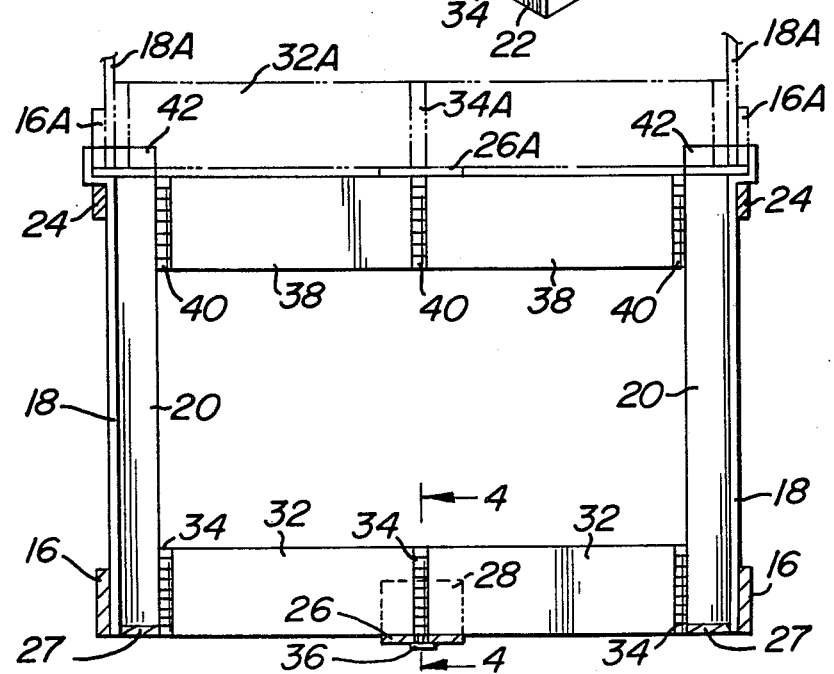

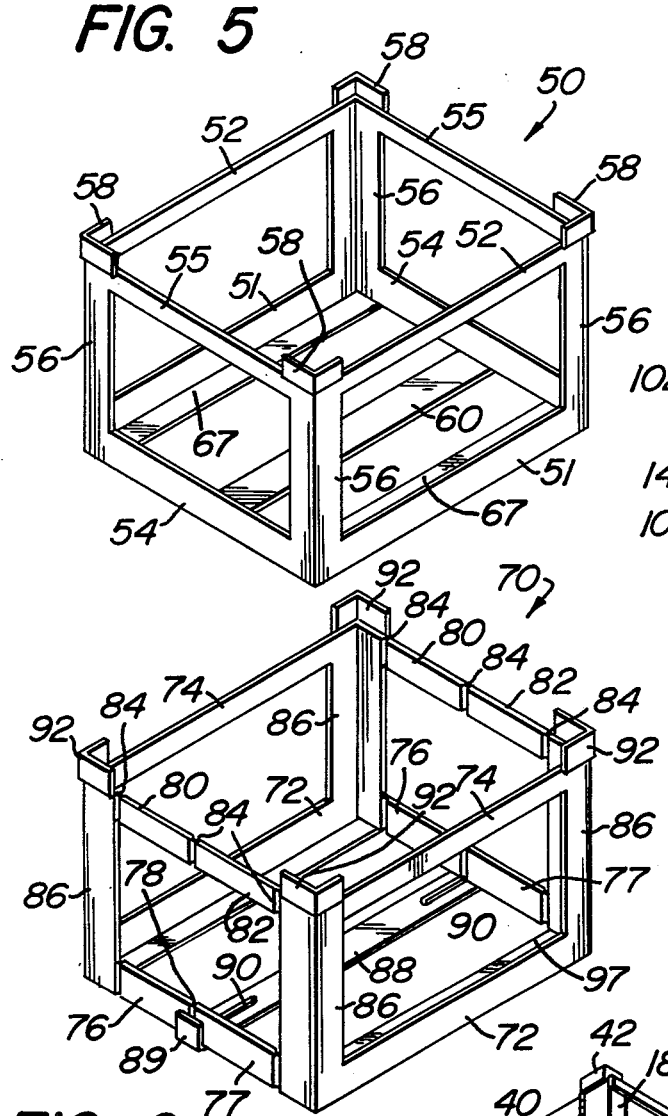
FIG. 5
FIG. 6
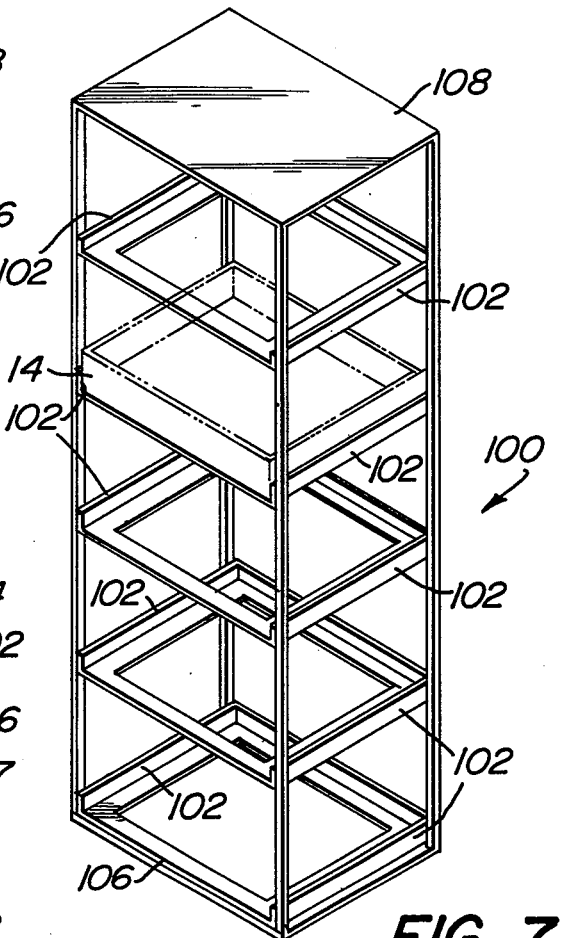
FIG. 7
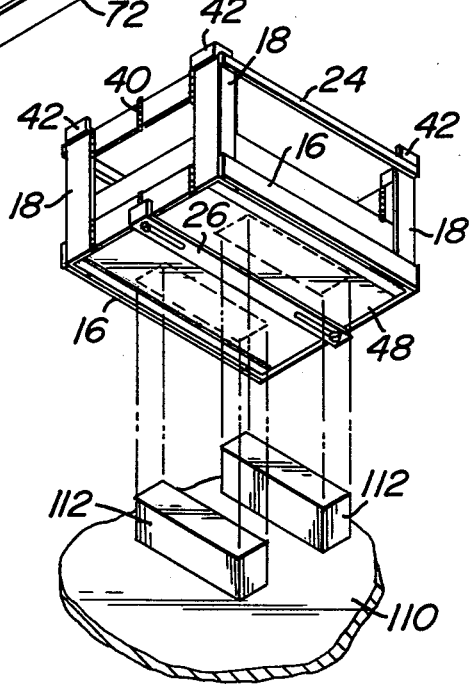
FIG. 8

SYSTEMS WITH DISPOSABLE TRAYS

The invention relates to a permanent, reusable, open skeletal-type crate which may be either permanently erect or collapsible. It is contemplated that the invention will be incorporated into a system for handling containers of fluid like milk and beer. The system includes an inexpensive tray which is disposable and which fits into the crate in order to hold the aforesaid fluid containers. The tray is readily separated from the crate so that the fluid containers can be transferred from a vehicle to the selling area or site specified by the customer. The relatively expensive crate remains at all times in protective control and cannot be diverted to unauthorized use. Moreover, the crate will not be particularly attractive to unauthorized uses since by its construction the crate is weak for all but its intended use. This renders a crate less attractive as a support device or storage container as is the case with the common milk case.

It is the current practice to package milk in fiber cartons or plastic containers which are assembled in units of up to 24 quarts or other sizes in crates made of wood, wire, plastic or a combination thereof. Such crates are of extremely sturdy construction and of a size as to constitute an attractive item for other purposes. Consequently the common milk crate has been diverted to many uses never intended by the dairies or other sponsoring organization. Such diversion constitutes a major cost factor in the distribution process.

Heretofore, it has been thought necessary because of the severe and adverse conditions of moisture and temperature in dairy and truck, to provide exceptionally sturdy crates. The practice was to deliver the crates and their contents to a store or other area where the crates were often left unguarded or otherwise diverted by the general public. This practice has proved to be extremely costly and a prime headache particularly in the dairy industry.

The present invention solves the foregoing problems by providing a collapsible crate which can be used in conjunction with a removable and disposable tray, such that the crate is at all times under the control of the dairy sponsoring organization.

With the present invention containers of milk are collated into the desired number of cartons. However, the containers of milk are not loaded directly into a crate, but instead are packed into trays that have been previously erected. The milk containers may be dropped into the trays which are in turn placed in the crates or the trays can be initially placed in the crates and the milk containers delivered into the trays. At point of sale or delivery the driver can remove the trays from the crates and place the loaded trays into a rack for delivery to the retail outlet or other final destination. Alternatively the driver can bring the crates into the store and remove the trays in the store with the crates then being returned to the truck. In either case the tray provides a method of handling groups of cartons of milk in the store. Finally, the store can dispose of the trays when they become empty. Also, the danger of contamination of the crates lying around the store has now been eliminated.

Another feature of the present invention is that the crates have exceptional stacking strength with special corner posts being a feature of the crates. Moreover, the crates usually support the tray in at least three bands in either direction. The crates may be of suitable materials such as metal or plastic and can be molded, welded or bolted depending upon the particular properties desired as well as cost. To remove temptation to diversion the crates are weak in side to side and end to end direction and are essentially unable to contain anything and in fact are suitable only for the intended use with disposable trays.

Reference is now made to various figures of the drawing wherein;

FIG. 1 is a three-dimensional view showing a combined collapsible crate and disposable tray constituting a first embodiment of the invention;

FIG. 2 shows the crate of FIG. 1 on a somewhat larger scale, with the crate being brought to the partially collapsed condition;

FIG. 3 is a view taken along the lines 3—3 of FIG. 1 and is somewhat enlarged with a partial view of the next crate stacked therein.

FIG. 4 is a sectional view taken along the lines 4—4 of FIG. 3.

FIG. 5 is a three-dimensional view showing a second embodiment of the crate of the present invention;

FIG. 6 is a three-dimensional view showing a third embodiment of the present invention;

FIG. 7 is a three-dimensional view showing a rack that is usable with the present invention; and FIG. 8 is a three-dimensional view showing the manner in which a tray can be ejected from a crate.

Referring now in greater detail to the various figures of the drawing wherein like reference characters refer to like parts, there is shown generally at 10 a system with disposable tray constituting a first embodiment of the present invention. The system 10 comprises collapsible crate 12 which holds removable and disposable tray 14.

The details of the collapsible crate 12 are shown in FIG. 2 wherein the crate 12 comprises horizontal side bars 16 from which extend vertical uprights 18, constituting the four corners of the collapsible crate 12. Each upright 18 comprises a side section 20 and an end section 22. A pair of side sections 20 of the uprights 18 are secured together by the horizontal side bars 16 and also by the upper horizontal struts 24.

A central bottom strap 26 (FIG. 2) and side bottom straps 27 are provided. Central strap 26 has upturned end tabs 28 at each end as well as a pair of slots 30 for the guidance of bottom end pieces 32. It will be seen from FIGS. 2, 3 and 4 that the bottom end pieces 32 are hinged together in central hinge 34, with each bottom end piece also being hingedly attached to an end section 22 by means of another hinge 34. Each central hinge 34 (FIGS. 3 and 4) is captively held in slot 30 by means of rivet 36 (FIG. 4) which is slidable along the slot 30.

There is also provided top end pieces 38 which are secured together in a central hinge 40. Each of the top end pieces 38 are secured to an end section 22 by side hinges 4.

From the foregoing it can be seen that in the absence of the tray 14 the collapsible crate 12 can be brought from the open position of FIG. 1 to the partly collapsed position of FIG. 2 by simply exerting an inward force upon the bottom end pieces 32. Such inward force has the effect of causing central hinge 34 with its rivet 36 to slide in the slot 30 of the strap 26. Thus, in the absence of the tray 14, the crate 12 has no essential long direction strength. Even with the presence of the tray 14 the strength in the longwise sense is limited to the strength of the tray 14. However, with the tray 14 in place, the crate 12 will remain erect. It is therefore clear that the crate 12 is not an attractive device having all of the uses of the present milk crates. For instance, the crate 12 could not be used to maintain an automobile out of contact with the ground since the top struts 24 offer limited support to a downwardly directed force. For similar reasons the crate 12 offers insufficient force when turned on its end. If turned on the side the crate 12 will simply collapse.

It should be noted that the crate 12 also possesses corner posts 42 which allow stacking of several collapsible crates, one on the other in the manner as generally shown in FIG. 3. Alternatively, the crates 12 can be positioned on their sides as to become partially collapsed, thereby saving space.

In use the tray 14 is simply inserted into the crate 12 as shown in FIG. 1. The tray 14 possesses sides 44, ends 46 as well as a bottom 48 which rests upon the strap 26. If desired, the side bars 16 are provided in the form of L-shaped pieces so as to provide additional bottom support for the tray 14. The tray may be provided in other forms, such as a flat plate.

The crate of the present invention may be provided in non-collapsible form as shown in FIG. 5 wherein the crate 50 comprises lower side bars 51 and upper side bars 52. The crate 50 further has lower end bars 54 and upper end bars 55 which span the distance between uprights 56. A bottom strap 60, side bottom straps 67 as well as corner posts 58 are also provided.

Yet another embodiment of the present invention is shown in FIG. 6 wherein the crate 70 may be made of plastic. In this embodiment there is provided lower side bars 72 and upper side bars 74 as well as lower end bars 76 and 77 which can be integrally molded together in a so-called living hinge 78. There is also provided upper end bars 80 and 82 which are integrally molded together in a living hinge 84. The embodiment 70 also possesses uprights 86 to which the side bars 72 and 74 and the end bars 76, 77, 80 and 82 are secured in integrally molded joints or through living hinges 84 as the case may be. A bottom strap 88 with upturned tabs 89 and slots 90 is provided in the manner of strap 26 of FIG. 1 with the living hinges 78 being movably captured in the slot 90. Side bottom straps 97 are also provided. The embodiment 70 also possesses corner posts 92 that can be integrally molded.

The trays 14 may be utilized with a wheeled rack (wheels not shown) of FIG. 7. The rack 100 of FIG. 7 possesses spaced L-shaped tracks 102 spanning the uprights 104 which extend between base 106 and top 108. It will be seen that the individual trays 14 with their contents can be readily removed or ejected from each crate 12 (FIG. 8) with the tray and its contents being slid upon a pair of L-shaped pieces 102.

The ejection of a tray from a crate is shown in FIG. 8 wherein an ejector mechanism 110 is provided with ejectors 112 that contact the bottom of the tray 14 without contacting the crate 12. The ejectors 112 simply contact the bottom 48 of the tray 14 while the crate is being held immovable. The ejectors may be in the form of protrusions on the floor of the vehicle, ejection being accomplished by simply lowering the crate over the protrusions until it contacts the bottom of the tray and dropping the crate to the floor of the vehicle, the tray remaining on the protrusions.

From the foregoing it can be seen that there is provided a combination crate and tray wherein the crate has essentially one function which is to hold the tray with the crate lacking essential strength and being incapable of otherwise serving as a container.

In particular the invention contemplates in one aspect the combination of a crate which receives a disposable tray. The crate can be present in the non-collapsible form of FIG. 5 wherein the crate comprises lower and upper side and end bars, at least one bottom strap and corner stacking posts.

Where the crate is collapsible as best shown in FIG. 2, the crate comprises horizontal side bars or struts connecting pairs of uprights. End pieces are hingedly secured to the uprights and to themselves in pairs with one bar of end piece being slidable along a slot as guide means to achieve a collapsing of the crate. Such collapsible crate is easily brought to the erect condition in order to receive a tray.

However, the crate of all embodiments is relatively weak in the side to side direction and end to end direction so as to make the crate unattractive for unauthorized uses.

The crate is preferably made of metal, such as a lightweight steel or a plastic, such as polypropylene with the various parts being stamped, die cut or molded as the case may be. The tray is preferably made of paper or fibrous or non-fibrous material such as composition board or corrugated paper.

Without futher elaboration the foregoing will so fully illustrate my invention that others may, by applying current or future knowledge, readily adapt the same for use under various conditions of service.

What is claimed as the invention is:

1. In combination, a collapsible crate and a disposable tray positioned within said crate, said crate being rectangular and bounded by four vertical corner uprights defining the four corners of said crate with two opposing sides and two opposing ends further defined therebetween, opposing sides of said crate having a lower horizontal side bar and an upper horizontal side bar extending between respective corner uprights defining said opposing sides, opposing ends of said crate having a lower horizontal end bar and an upper horizontal end bar extending between respective corner uprights defining said opposing ends, each end bar being hingedly secured to the respective upright adjacent thereto, each end bar comprising two bar pieces being secured together with a central hinge located centrally of said end bars, a bottom bar extending generally parallel to said side bars, said bottom bar having slot means with said central hinge of each said lower end bar being slidable in said slot means, said bottom bar being slidably connected to each said lower end bar and said crate being collapsible to bring the side bars closer to each other to the extent each said central hinge is slidable in said slot means except when said disposable tray is positioned within said crate and rests upon said bottom bar.

2. The combination of claim 1 including filled cartons in said tray.

3. The combination of claim 1 wherein said tray is made of corrugated paper.

4. The system of claim 1 including corner stacking posts.

* * * * *